Aug. 27, 1957  J. R. NEWCOMER, JR  2,804,326
LATCH FASTENER
Filed June 23, 1955
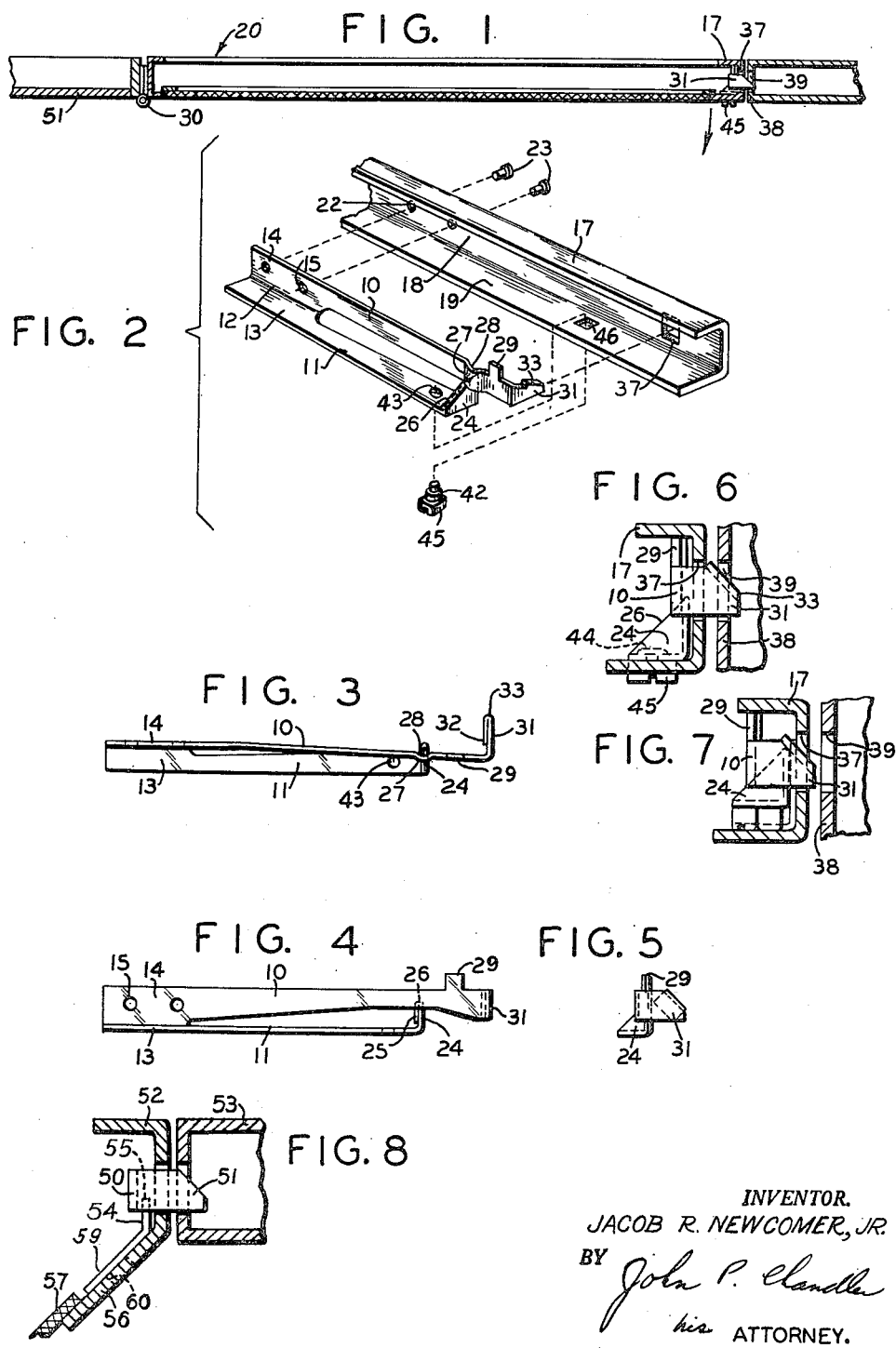
INVENTOR.
JACOB R. NEWCOMER, JR.
BY John P. Chandler
his ATTORNEY.

United States Patent Office 2,804,326
Patented Aug. 27, 1957

2,804,326
LATCH FASTENER

Jacob R. Newcomer, Jr., Westwood, N. J., assignor to Camloc Fastener Corporation, Paramus, N. J., a corporation of New York Application June 23, 1955, Serial No. 517,498

7 Claims. (Cl. 292—83)

This invention relates to latch fasteners and relates more particularly to a novel, readily releasable latch fastener designed primarily, although not exclusively, for electric lighting fixtures.

In one embodiment of the invention the latch fastener includes a latch arm and a lever arm, both spring mounted on a common support and wherein a manipulating element associated with the lever arm may be manually moved, displacing the lever arm and retracting the latch arm which has a bolt portion carried thereby.

An important object of the present invention is to provide an improved latch structure which may be stamped from a single piece of spring sheet metal wherein the inherent resiliency of the metal normally maintains the bolt portion of the latch arm in extended or locking position and the lever arm in inoperative position, thus dispensing with the need for separate spring elements for urging the arms to their normal position.

Another object of the invention is to provide a one-piece latch fastener which may be quickly installed as by welding or by drilling a number of holes and setting one or two rivets or other fastening elements.

In the installation of fluorescent lighting fixtures a fixed frame is usually employed for supporting the tubular lighting elements and a second frame is hinged thereto which supports louvers or light transmissive panels. The latch fastener of the present invention is particularly well adapted for securing the second frame in place on the fixed frame and which permits the bolt portion of the latch arm to be released from its interlocking engagement with the fixed frame to allow the hinged frame to be dropped downwardly during servicing of the lighting elements.

Frames of the character described are usually relatively long, but long or short they usually require a plurality of releasable fasteners to maintain the movable frame in latched position. A push-button type of release is usually provided for each fastener and all of the push-buttons must be manually retained in depressed position in order to permit release of the frame.

Another important object of the present invention is to provide a rotatable stud for the latch fastener which is first depressed and then rotated to retain it in non-registry to the hole in the frame, thereby retaining the bolt in unlocked position. In this fashion one operator can release all the fasteners prior to freeing the frame for downward travel instead of requiring, for example, ten operators to release ten fasteners. This arrangement is also useful where a movable frame has only a single fastener and wherein the frame is so light in weight that its fall due to gravity does not overcome the resistance of the spring in the lever arm. In cases, however, where the frame is heavier a simple depressible stud may be used or the stud may be eliminated altogether and the lever arm displaced by inserting a pencil in the opening in the frame.

The invention is illustrated with reference to fixed and movable frames of a type suitable for use in lighting fixtures but other modifications and uses of the fastener will be readily apparent to those skilled in the art.

In the drawing:

Fig. 1 is a broken section taken through a fixed frame and a movable frame hinged thereto and employing the fastener of the present invention.

Fig. 2 is an exploded view showing the component parts of the latch fastener.

Fig. 3 is a plan view of the fastener with the latch arm in partly retracted position.

Fig. 4 is a side elevation thereof.

Fig. 5 is an end elevation thereof.

Fig. 6 is a broken section taken through the frame members and showing the latch in locked position.

Fig. 7 is similar to Fig. 6 but shows the parts in unlocked position.

Fig. 8 is a broken section taken through a modified arrangement.

The latch fastener illustrated in Fig. 2 may be stamped from a single piece of spring sheet metal and is of bifurcated construction providing a latch arm 10 and a lever arm 11, both supported by an angular base section having a longitudinal bend 12 to divide the base section into portions 13 and 14 generally at right angles to each other, the latter of which is provided with openings 15 to receive rivets or bolts.

The fastener is adapted to be received within a channel having walls 17, 18 and 19 forming part of a frame 20. Intermediate wall 18 has openings 22 matched with openings 15 to receive rivets 23 for mounting the latch fastener. This securing means is suggestive only.

The latch retracting arm or lever 11 has at its outer end an upturned portion 24 and a downturned terminal portion 25 providing a diagonally and outwardly inclined camming edge 26 which is rounded as shown in Fig. 4. The latch arm 10 when at rest and not under a bending stress is in substantial engagement with wall 18 of the channel and adjacent its outer end it is formed with a substantially U-shaped offset portion 27 forming an opening 28 for the wedge shaped actuating element 24 to enter. Because of the fact that the latter has an inclined plane action it is desirable to form a guide portion 29 on one side of the offset portion which engages the lower surface of upper wall 17 during its rearward travel and prevents upward deformation of the lever arm over a long period of use. A bolt portion is formed by terminal portions 31 and 32 lying at right angles to the latch arm and joined along a downwardly inclined diagonal line of fold 33.

Wall 18 has a square opening 37 through which the bolt portion passes and the fixed member 38 to be secured has an opening 39 to receive the bolt portion. In order to provide ample clearance between the right angularly disposed arms 10 and 11 during relative movement some of the metal from the blank is removed while forming these arms.

One means for displacing the latch retracting arm 11 to retract the latch arm may comprise a stud having a round shank 42 which is received in an opening 43 in the lever arm and its upper reduced terminal is flattened as shown at 44 (Fig. 6) to secure the stud against removal from the lever arm while permitting free rotation thereof. A non-circular head 45 is formed at the lower end of the stud, the head being provided with a slot for a screw driver. The square head is normally positioned in a square opening 46 in lower wall 19 of the channel and the lower surface of the head is substantially flush with the lower surface of the channel. For clarity of illustration the head is shown in Figs. 1 and 6 as projecting slightly below this surface but in most installations it should be flush or substantially so since any projection tends to cast a shadow.

Movable frame 20 is shown as being hinged at 30 to the fixed frame member 51. It will be seen from the foregoing that the bolt portion 31 normally projects through opening 37 in intermediate wall 18 of the channel. When the latch is to be released a screw driver may be inserted in the slot in head 45 of stud 42 and the stud moved upwardly until the lower surface of the head clears the upper surface of lower wall 19 of the channel. The stud is then rotated about 45°, at which time the stud remains in displaced position. This movement also causes cam edge 26 to move the lever arm, thus disengaging the bolt portion 31 from opening 39 of the fixed frame 38.

The importance of locking the head in depressed position relative to frame wall 19 is apparent when the latch fastener is used in hinged frames which are sufficiently light in weight that when the stud is displaced from its normal outward position the frame does not drop due to gravity. In instances where the frame is heavier and only one latch is used it is not necessary to lock the stud in displaced position and in this instance the stud can be made non-rotatable as by forming a tight head 44 at the upper end of the stud. Alternatively, both the stud head 45 and the frame opening 46 can be round.

In the second form of the invention shown in Fig. 8 the latch arm 50 and the bolt portion 51 is the same as in the first form of the invention and the latter locks movable frame 52 to fixed frame 53. In this instance, however, the lever arm 54 is disposed at less than a right angle to the latch arm 59 and a finger 55 engages the inner surface of the latch arm. The movable frame has an angularly disposed frame 56 supporting the light transmissive element 57 and an opening 60 is formed in the flange. In this form of the invention a pencil or tool may be inserted through the opening to retract the latch arm rearwardly in a direction normal to the surface of flange 60.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

1. A latch fastener formed from a single blank of sheet metal and including an angular base section and elongated spring arms extending longitudinally from the base section and lying at an angle to each other, a bolt portion extending at right angles from the outer end of one arm and an inclined latch bolt retractor at the outer end of a second arm and formed with a diagonal camming edge which engages the first arm with a camming action to retract the bolt portion when the second arm is flexed.

2. A latch fastener for mounting in an angular member provided with openings in at least two of its walls, said fastener formed from a blank of sheet metal and including an angular base section and elongated spring arms extending longitudinally from the base section and lying at generally a right angle to each other, a bolt portion extending at right angles from the outer end of one arm and extending through one of the openings in the angular member, an inclined latch bolt retractor at the outer end of a second arm and formed with a diagonal camming edge which engages the first arm with a camming action when the second arm is flexed and a depressible pin carried by the second arm extending through a second opening in the angular member.

3. A latch fastener formed from a single blank of sheet metal and including an angular base section and elongated spring arms extending longitudinally from the base section and lying at greater than a right angle to each other, a bolt portion extending at right angles from the outer end of one arm and an inclined latch bolt retractor at the outer end of a second arm and which engages and retracts the first arm when the second arm is flexed.

4. A latch fastener for mounting in a channel and comprising a base section and angularly disposed spring arms extending longitudinally from the base section and formed, respectively, with a latch bolt element and a latch retracting element at their outer ends, the latch bolt element having a downwardly and outwardly inclined upper edge, the latch retracting element having an upwardly and outwardly inclined upper edge which, when moved upwardly, engages the first arm to retract the same with a camming action.

5. A latch fastener for mounting in a channel having a plurality of non-circular openings therein and comprising a base section and angularly disposed spring arms extending longitudinally from the base section and formed, respectively, with a latch bolt element and a latch retracting element at their outer ends, the latch bolt element extending through one of the openings in the channel and having a downwardly and outwardly inclined upper edge, the latch retracting element having an upwardly and outwardly inclined upper edge which, when moved upwardly, engages the first arm to retract the same with a camming action, and a rotatable pin mounted on the second arm extending through another one of said openings and which, when depressed and rotated, underlies the channel and retains the second arm in displaced position.

6. A latch fastener for mounting in a channel and comprising an angular base section for mounting in the channel and spring arms extending longitudinally from the base section and formed, respectively, with a latch bolt element and a latch retracting element at their outer ends, the latch bolt element having a horizontal lower edge and a downwardly and outwardly inclined upper edge, and an inwardly offset portion on the first arm to receive the latch retracting element, the latter having an upwardly and outwardly inclined upper edge which, when moved upwardly, engages the offset portion of the first arm to retract the same with a camming action.

7. A latch fastener formed from sheet material and including a base section and elongated spring arms extending longitudinally from the base section and lying at an angle to each other, the outer terminal portion of one arm being bent along a transverse line to form a latch bolt portion extending substantially at right angles to said arm; and a latch bolt retractor formed with a camming surface providing a latch bolt retractor at the outer end of a second arm which engages the first arm with a camming action to retract the bolt portion when the second arm is manually flexed.

References Cited in the file of this patent

UNITED STATES PATENTS

| | | |
|---|---|---|
| 281,268 | Haskell | July 17, 1883 |
| 1,182,238 | Arkin | May 9, 1916 |
| 2,483,061 | Omans | Sept. 27, 1949 |